(12) United States Patent
Padaki et al.

(10) Patent No.: US 12,413,476 B2
(45) Date of Patent: Sep. 9, 2025

(54) SYSTEMS AND METHODS FOR HIGH AVAILABILITY IN TELCO CLOUD FOR RADIO ACCESS NETWORK

(71) Applicant: EdgeQ, Inc., Santa Clara, CA (US)

(72) Inventors: Gururaj Padaki, Bangalore (IN);
Sriram Rajagopal, Karnataka (IN);
Hariprasad Gangadharan, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 0 days.

(21) Appl. No.: 18/528,164

(22) Filed: Dec. 4, 2023

(65) Prior Publication Data

US 2024/0179067 A1     May 30, 2024

Related U.S. Application Data

(63) Continuation of application No. 17/993,923, filed on Nov. 24, 2022, now Pat. No. 11,863,393.

(51) Int. Cl.
| | |
|---|---|
| *H04L 41/0895* | (2022.01) |
| *H04L 41/0668* | (2022.01) |
| *H04L 41/0806* | (2022.01) |
| *H04L 47/125* | (2022.01) |

(52) U.S. Cl.
CPC ...... *H04L 41/0895* (2022.05); *H04L 41/0668* (2013.01); *H04L 41/0806* (2013.01); *H04L 47/125* (2013.01)

(58) Field of Classification Search
CPC ............ H04L 41/0895; H04L 41/0668; H04L 41/0806; H04L 47/125; H04L 43/20; H04L 43/0817; H04L 43/0852
See application file for complete search history.

(56) References Cited

U.S. PATENT DOCUMENTS

| | | | |
|---|---|---|---|
| 11,356,500 B1 * | 6/2022 | Gupta | H04L 67/1001 |
| 11,838,169 B1 * | 12/2023 | Sudletsky | H04L 41/0613 |
| 12,068,922 B2 * | 8/2024 | Chow | G06F 9/5077 |
| 2020/0162348 A1 * | 5/2020 | Suthar | H04L 41/0894 |
| 2021/0119940 A1 * | 4/2021 | Kumar | G06F 9/45558 |
| 2022/0124560 A1 * | 4/2022 | Yeh | H04L 41/5025 |
| 2022/0182318 A1 * | 6/2022 | Shilimkar | H04L 43/10 |
| 2022/0224776 A1 * | 7/2022 | Doshi | G06F 12/0897 |

(Continued)

*Primary Examiner* — Michael Won
(74) *Attorney, Agent, or Firm* — North Weber & Baugh; Michael North

(57) ABSTRACT

System and method embodiments are disclosed for high availability management for open radio access network (O-RAN). The O-RAN may be deployed on cloud with the O-CU deployed on a region cloud, O-RUs deployed on a cell site O-Cloud, and O-DUs deployed on an edge cloud. Each O-RU may comprise one or more RF clusters, computation clusters, and interface clusters. O-RU instances and O-DU instances may be instantiated with redundancy on the cell site O-Cloud and on the edge cloud, respectively, to serve one or more users. Local and central high-availability (HA) managers may be used to monitor O-RU instance performance for failure prediction/detection and to monitor internal states of each O-DU instance. In response to O-RU instance failure or O-DU internal states beyond/below state thresholds, new O-RU or O-DU instances may be instantiated as replacement instances for O-Cloud high availability management.

18 Claims, 13 Drawing Sheets

(56) References Cited

U.S. PATENT DOCUMENTS

| | | | |
|---|---|---|---|
| 2022/0279535 A1* | 9/2022 | Tsui | H04L 25/0222 |
| 2022/0291961 A1* | 9/2022 | Saha | G06F 9/50 |
| 2022/0300418 A1* | 9/2022 | Baugh | G06F 12/0284 |
| 2022/0321566 A1* | 10/2022 | Coyle | H04L 63/101 |
| 2023/0003826 A1* | 1/2023 | Parker | G01S 5/0205 |
| 2023/0006889 A1* | 1/2023 | Thyagaturu | H04L 41/5054 |
| 2023/0032088 A1* | 2/2023 | Goswami | G06F 8/71 |
| 2023/0057469 A1* | 2/2023 | Hoole | H04L 41/0895 |
| 2023/0087665 A1* | 3/2023 | Prakash | H04W 88/00 |
| | | | 370/235 |
| 2023/0336439 A1* | 10/2023 | Trujillo | H04L 45/586 |
| 2023/0397212 A1* | 12/2023 | Elshafie | H04L 5/0094 |
| 2023/0413111 A1* | 12/2023 | Kotaru | H04W 28/0858 |
| 2024/0040506 A1* | 2/2024 | Uziel | H04W 52/0206 |
| 2024/0106709 A1* | 3/2024 | Shete | H04L 45/64 |
| 2024/0251254 A1* | 7/2024 | Luthra | H04L 41/0816 |
| 2024/0291712 A1* | 8/2024 | Stephan | H04L 41/0895 |
| 2024/0378506 A1* | 11/2024 | D'Oro | G06N 20/00 |

* cited by examiner

800

```
┌─────────────────────────────────────────────────────────────┐
│ Given a cell site O-Cloud comprising multiple O-RUs, coupling│ ─ 805
│ each of the multiple O-RUs to a local HA manager respectively│
└─────────────────────────────────────────────────────────────┘
                              ↓
┌─────────────────────────────────────────────────────────────┐
│ Instantiating one or more O-RU instances, with redundancy,  │
│ on the cell site O-Cloud to serve one or more users         │ ─ 810
│ respectively, the one or more O-RU instances involve one or │
│ more O-RUs among the multiple O-RUs                         │
└─────────────────────────────────────────────────────────────┘
                              ↓
┌─────────────────────────────────────────────────────────────┐
│ Monitoring, using the local HA manager for each of the one  │
│ or more O-RU instances, instance performance of the one or  │ ─ 815
│ more O-RU instances for failure prediction/detection        │
└─────────────────────────────────────────────────────────────┘
                              ↓
┌─────────────────────────────────────────────────────────────┐
│ In response to a failure for the at least one O-RU instance │
│ being detected or predicted, instantiating one or more new  │ ─ 820
│ O-RU instances in the same O-RU with detected or predicted  │
│ O-RU instance failure or in another O-RU for replacement    │
└─────────────────────────────────────────────────────────────┘
```

FIG. 8

SYSTEMS AND METHODS FOR HIGH AVAILABILITY IN TELCO CLOUD FOR RADIO ACCESS NETWORK

CROSS REFERENCE TO RELATED PATENT APPLICATIONS

This application is a continuation of U.S. patent application Ser. No. 17/993,923, entitled "SYSTEMS AND METHODS FOR HIGH AVAILABILITY IN TELCO CLOUD FOR RADIO ACCESS NETWORK", naming as inventors Gururaj Padaki, Sriram Rajagopal, and Hariprasad Gangadharan, and filed on Nov. 24, 2022, which application is hereby incorporated herein by reference in its entirety.

TECHNICAL FIELD

The present disclosure relates generally to wireless communication. More particularly, the present disclosure relates to systems and methods for high availability in telco cloud for radio access network (RAN).

BACKGROUND

The importance of telecommunication in today's society is well understood by one of skill in the art. Advances in telecommunication have resulted in the ability of a communication system to support telecommunication at different levels, e.g., cell site, distributed unit (DU) site, etc.

Telecommunication cloud, also referred as Telco cloud, is infrastructure cloud which requires a high level of high availability by providing redundant hardware, early detection/prediction, hierarchical deployment. Telco cloud may support flexible and efficient deployment of the applications that service providers use to manage and deliver services. Telco cloud may add services more quickly, respond faster to changes in demand, and centrally manage their resources more efficiently. A current approach to address the high availability requirement in Telco RAN is adding redundant resources. However, such an approach adds cost for Telco cloud deployment, especially when the redundant resources are not used efficiently.

Accordingly, what is needed are systems and methods to meet the high availability requirement in Telco RAN for improving efficiency and performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 8 depicts a flow diagram for high availability management in the O-RU, according to embodiments of the present disclosure.

DETAILED DESCRIPTION OF EMBODIMENTS

Figure 1:
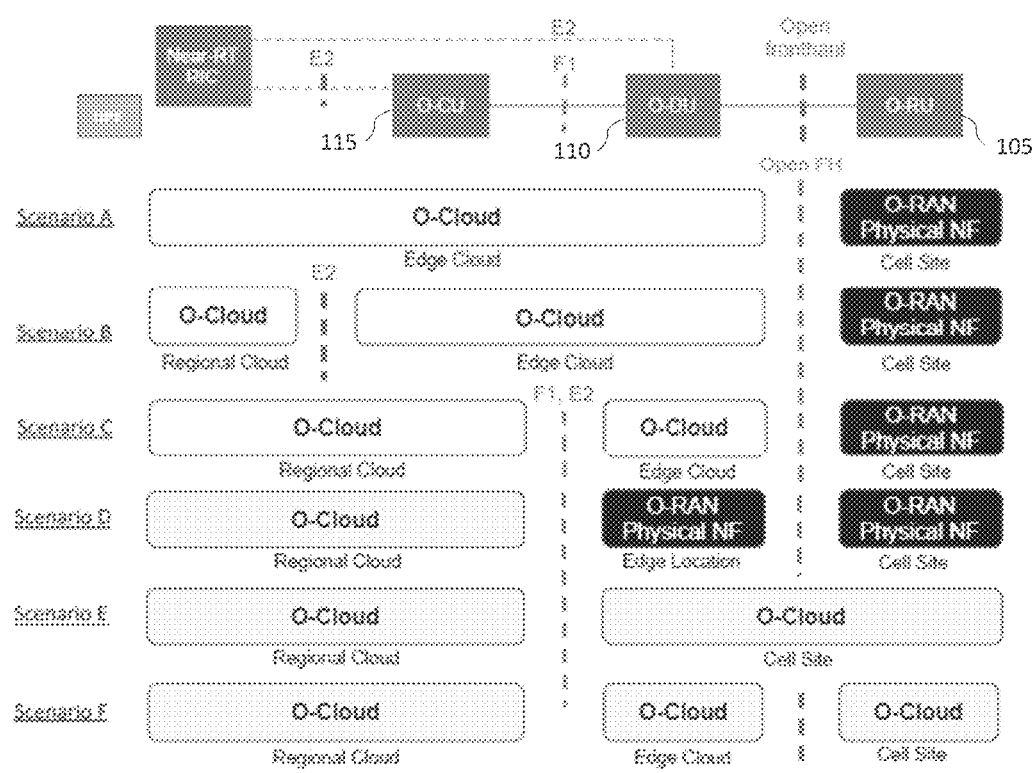
FIG. 1 ("FIG. 1") depicts different deployment scenarios for open radio access network (O-RAN) cloud platform to support RAN functions.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. O-RAN Deployment Scenarios

A radio access network (RAN) is part of a telecommunication system. It implements a radio access technology (RAT) to provide a connection between a device, e.g., a mobile phone, and a core network (CN). O-RAN is an approach based on interoperability and standardization of RAN elements, including a unified interconnection standard for white-box hardware and open source software elements from different vendors.

O-RAN alliance has specified O-RAN Cloud (O-Cloud) as O-RAN includes the cloudification of RAN for single or multi-tenants and automation of RAN end-to-end. O-Cloud may include edge cloud as a virtual distribution unit (vDU) and/or a virtual central unit (vCU). FIG. 1 depicts various O-RAN deployment scenarios according to embodiments of the present disclosure. As shown in FIG. 1, an O-RU 105 couples to an O-CU 115 via an O-DU 110. O-Cloud platform may support RAN functions and involve hardware accelerator required by the RAN functions and software stacks, which be decoupled from the hardware accelerator. Each O-cloud uses open interface.

Different deployment scenarios may be used for an O-RAN. For example, the O-RU may be proprietary and deployed on the cell site (e.g., in Scenarios A-D), while the O-DU and O-CU may be deployed separately as a region cloud and an edge cloud, or jointly deployed in an edge cloud (e.g., scenario A). Alternatively, the O-DU and the O-RU may be jointly deployed at a cell site, as shown in scenario E. It shall be noted that in scenarios E and F, an O-RAN may be deployed fully on cloud with the O-CU deployed on a region cloud, the O-RU either deployed on an O-Cloud on a cell site (O-DU deployed on an Edge Cloud in this case) or deployed together with the O-DU on a cell site. A full O-RAN cloud deployment may provide cloud services extending from O-RU to O-DU and O-CU.

Figure 2A:
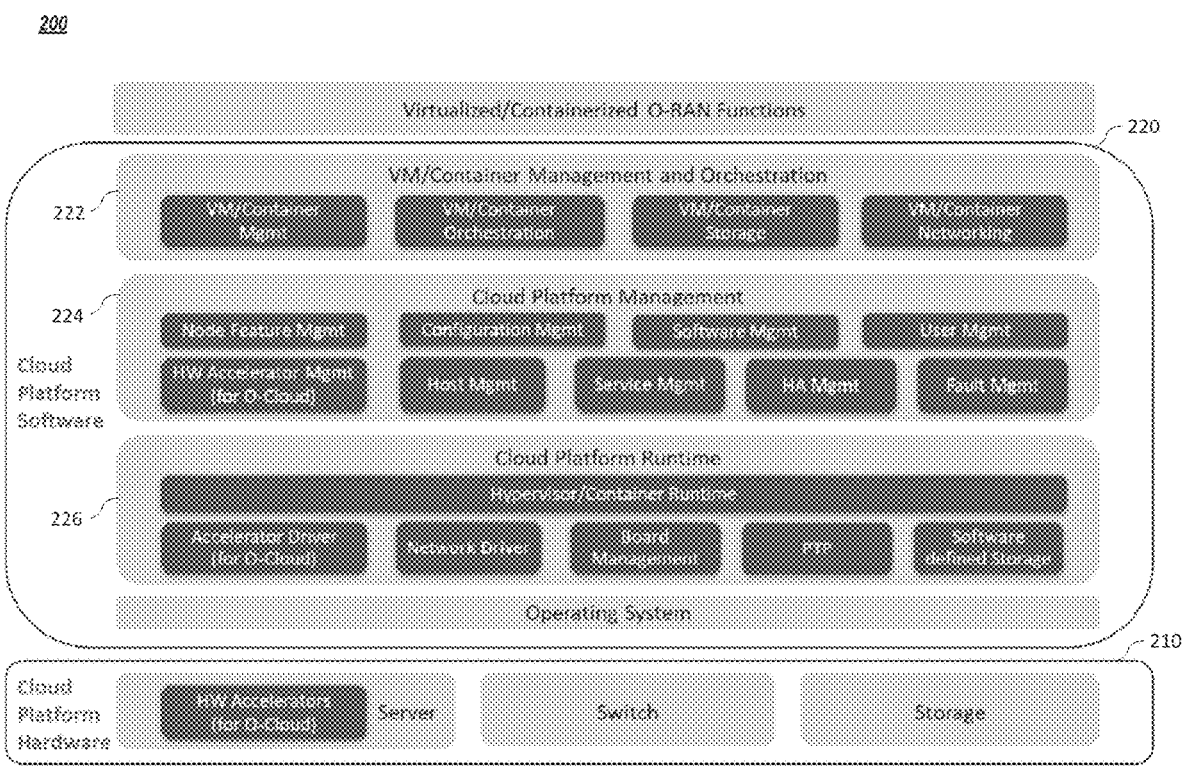
FIG. 2A depicts a block diagram for cloud platform components, according to embodiments of the present disclosure.

FIG. 2A depicts a block diagram for cloud platform components, according to embodiments of the present disclosure. The cloud platform 200 comprises cloud platform hardware 210 (e.g., hardware accelerations for servers, switches and storages, etc.) and cloud platform software 220. The cloud platform software 220 may comprise different modules for different functions, e.g., a VM/container management and orchestration module 222, a cloud platform management module 224 for various management functions (e.g., service management, host management, user management, fault management, etc.), and a cloud platform runtime module 226 for various accelerator/network driver running, storage defining, etc.

Figure 2B:
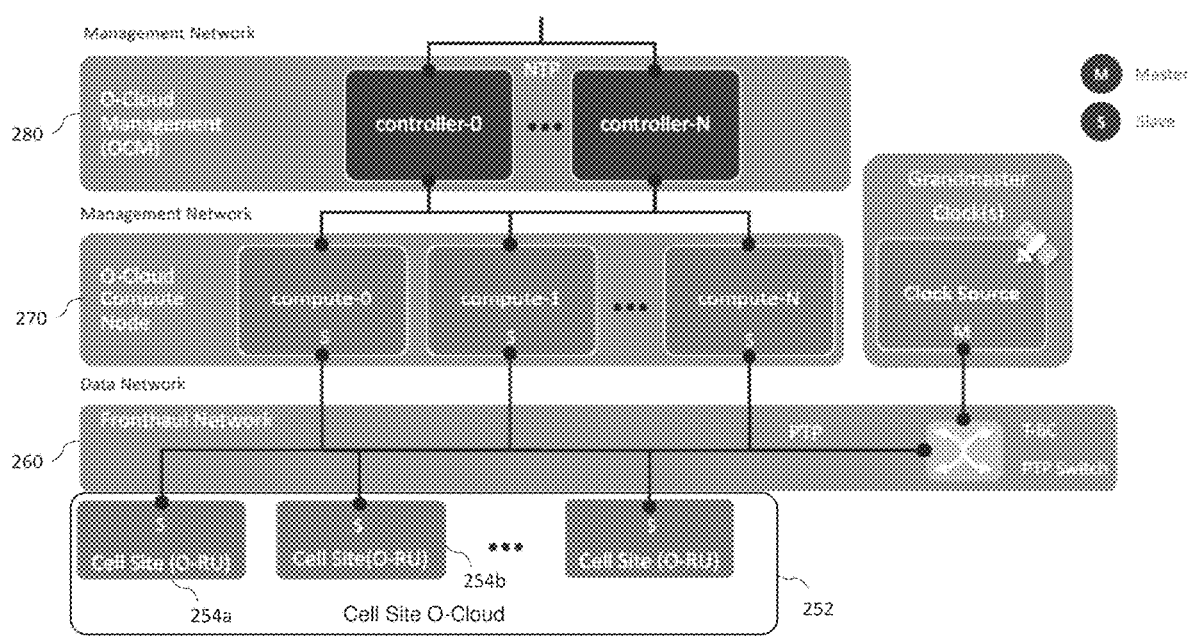
FIG. 2B depicts a block diagram for O-RAN cloud deployment, according to embodiments of the present disclosure.

FIG. 2B depicts a block diagram for O-RAN cloud deployment, according to embodiments of the present disclosure. A plurality of O-RUs, e.g., 254a, 254b, are deployed as a cell site O-Cloud 252, which may be configured into multiple instances to serve multiple communication service providers or users. The cell site O-Cloud 252 couples to a management network via a fronthaul network 260. The management network may comprise O-Cloud management (OCM) 280, which comprises one or more controllers, and a plurality of O-Cloud compute nodes 270. The one or more controllers may be synchronized or coordinated for operation via network time protocol (NTP), while the plurality of O-RUs may be synchronized or coordinated for operation via precision time protocol (PTP). Both the O-RUs and the compute nodes may provide service of high availability with redundant hardware, software, or a combination of both.

Figure 3:
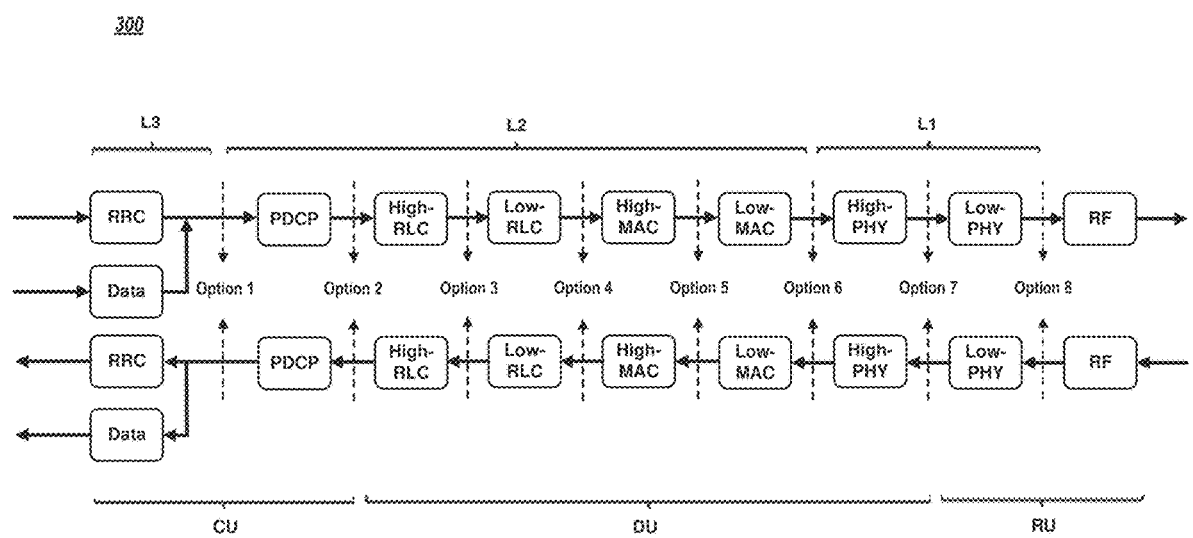
FIG. 3 depicts different functional splits of an O-RAN, according to embodiments of the present disclosure.

O-RAN supports the option of placing network functions (NFs) in different places along the signal path. That option, also referred as a functional split, lets network engineers optimize performance and make tradeoffs. The function splits involves different 5G Protocol Stack layers, i.e. layer 1, layer 2 and layer 3. The 5G layer-1 (L1) is PHYSICAL Layer. The 5G layer-2 (L2) includes MAC, radio link control (RLC), and packet data convergence protocol (PDCP) sublayers. The 5G layer-3 (L3) is a radio resource control (RRC). FIG. 3 depicts different functional splits of an O-RAN. 3GPP has defined 8 functional split options for fronthaul networks in Technical Report 38.801 V 14.0.0 (2017-03) as below:

Option 1 (RRC/PCDP);
Option 2 (PDCP/RLC Split);
Option 3 (High RLC/Low RLC split, or Intra RLC split);
Option 4 (RLC-MAC split);
Option 5 (Intra MAC split);
Option 6 (MAC-PHY split);
Option 7 (Intra PHY split); and
Option 8 (PHY-RF split).

The DU is responsible for high L1 and low L2, which contains the data link layer and scheduling functions. The CU is responsible for high L2 and L3 (network layer) functions. For example, with an option 2 split, some L2 Ethernet functions may reside in the remote radio head (RHH). Also, aggregation and statistical multiplexing may be done before the data is passed across the fronthaul network. This may greatly reduce the amount of data transmitted across the interface. In another example, with an option 7 split, some L1 functions may reside in the baseband unit (BBU) and pooling gains may be realized with centralized processing.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), operational preference, etc. With a cloud infrastructure, a Telco cloud may add services more quickly, respond faster to changes in demand, and centrally manage their resources more efficiently. A current approach to address the high availability requirement in Telco RAN is adding redundant resources. However, such an approach adds cost for Telco cloud deployment, especially when the redundant resources are not used efficiently.

Described in the following sections are system and method embodiments to meet the high availability requirement in Telco RAN for improving efficiency and performance.

B. Embodiments for High Availability in O-RU

An RU converts radio signals sent to and from the antenna to a digital signal that can be transmitted over the fronthaul to a DU. An O-RU is a logical node hosting low PHY and RF processing based on a lower layer functional split. Function split option 7 divides into sub-options 7.1, 7.2, and 7.3, which vary in the way of dividing the PHY between the DU and the RU. Split Option 7.2 is adopted by O-RAN fronthaul specifications for splitting between high PHY residing in O-DU and low PHY residing in O-RU.

Figure 4:
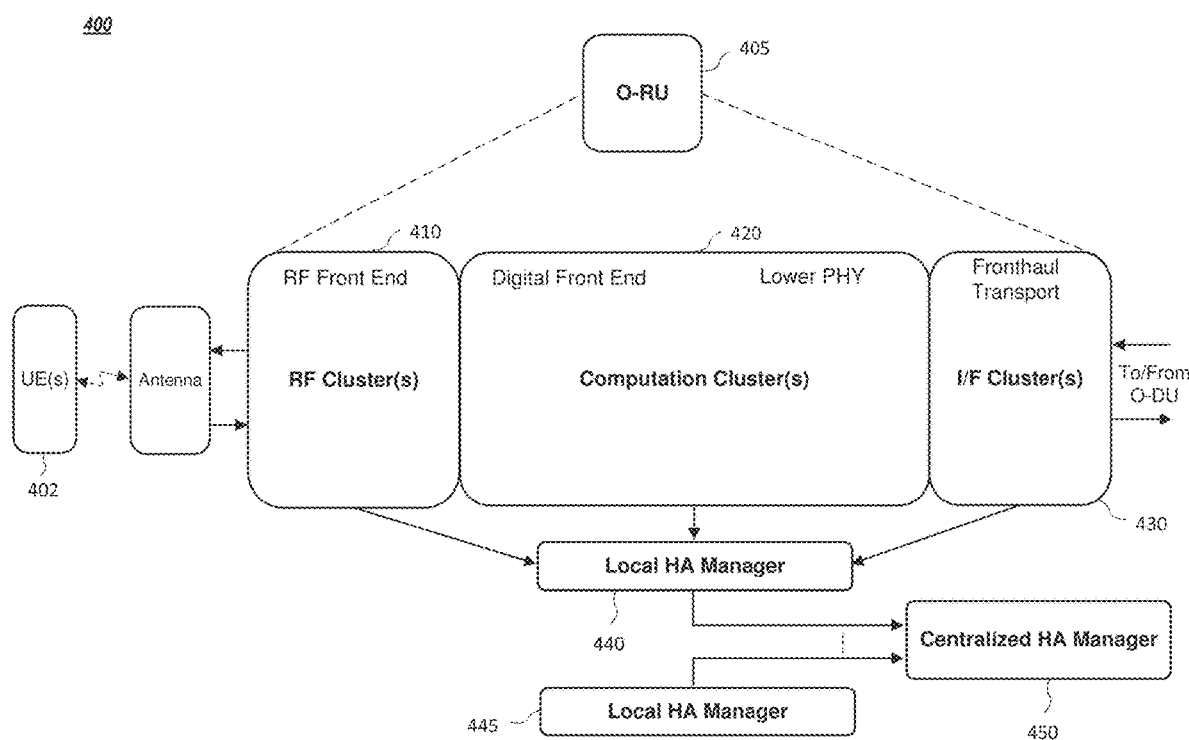
FIG. 4 depicts a block diagram of an O-RAN radio unit (O-RU), according to embodiments of the present disclosure.

FIG. 4 depicts a block diagram of an O-RU, according to embodiments of the present disclosure. The O-RU 405 may be deployed on a cell site and comprise one or more RF clusters 410, one or more computation clusters 420, and one or more interface clusters 430. The one or more RF clusters 410 handle RF front end (RF FE) to establish wireless communications with one or more user equipment (UE) 402 via O-RU antenna. The one or more computation clusters 420 handle digital front end (DFE) and low PHY baseband processing. The one or more interface clusters 430 handle fronthaul transport, e.g., interfacing to/from an O-DU. A local high availability (HA) manager 440 couples to all three types of clusters for broadcasting internal state and establishing a low latency path to a centralized HA manager for load balancing decision across cell sites if required. In one or more embodiments, the internal state broadcasting may be symbol tick-based broadcasting.

Figure 5:
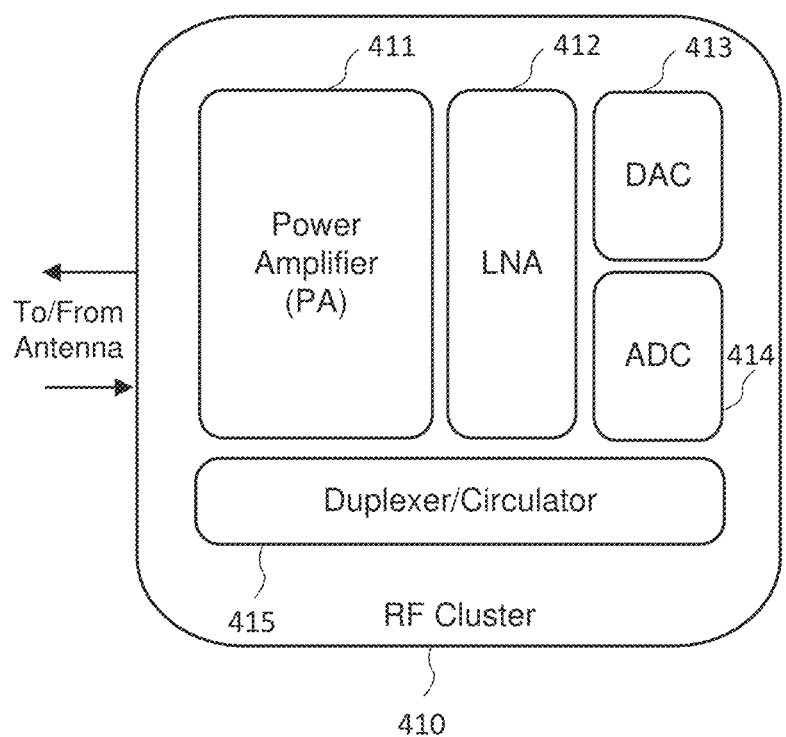
FIG. 5 depicts a block diagram of a radio-frequency (RF) cluster in the O-RU, according to embodiments of the present disclosure.

FIG. 5 depicts a block diagram of one RF cluster in the O-RU, according to embodiments of the present disclosure. The RF cluster 410 provides redundant RF processing components, such as power amplifiers (Pas) 411, low noise amplifiers (LNA) 412, digital-to-analog converters (DACs) 413, analog-to-digital converters (ADCs) 414, duplexers/circulators 415, smart RF switch/sensor, etc., to establish one or more active RF paths.

In one or more embodiments, the local HA manager 440 may monitor the RF cluster 410 and use one or more parameters for RF path management, such as activating a new RF path, adding more resources to an active RF path, removing resources from an active RF path, deactivating an active RF path, etc. The local HA manager 440 may use Artificial intelligence (AI) or machine learning (ML) based algorithm for RF path management. The one or more parameters may comprise temperature, RF power, changing rate of temperature, changing rate of RF output power, voltage variations, current variations, etc. The local HA manager 440 may also establish a low latency path to a centralized HA manager 450, which may connect to a plurality of local HA managers, including local HA manager 440 for other O-RUs, such that the centralized HA manager may implement HA management for O-RUs at a high hierarchical level.

In one or more embodiments, HA implementation on the cell site level or O-RU level may provide redundant low PHY, transceiver, and PA, enable prediction or early detection of RF component failure based on AI/ML algorithm. New instance(s) may be enabled using smart RF switch(es) in case of an existing instance failure. The local HA manager and the central HA manager may form hierarchical and localized redundant resource management for low latency RF path.

Figure 6:
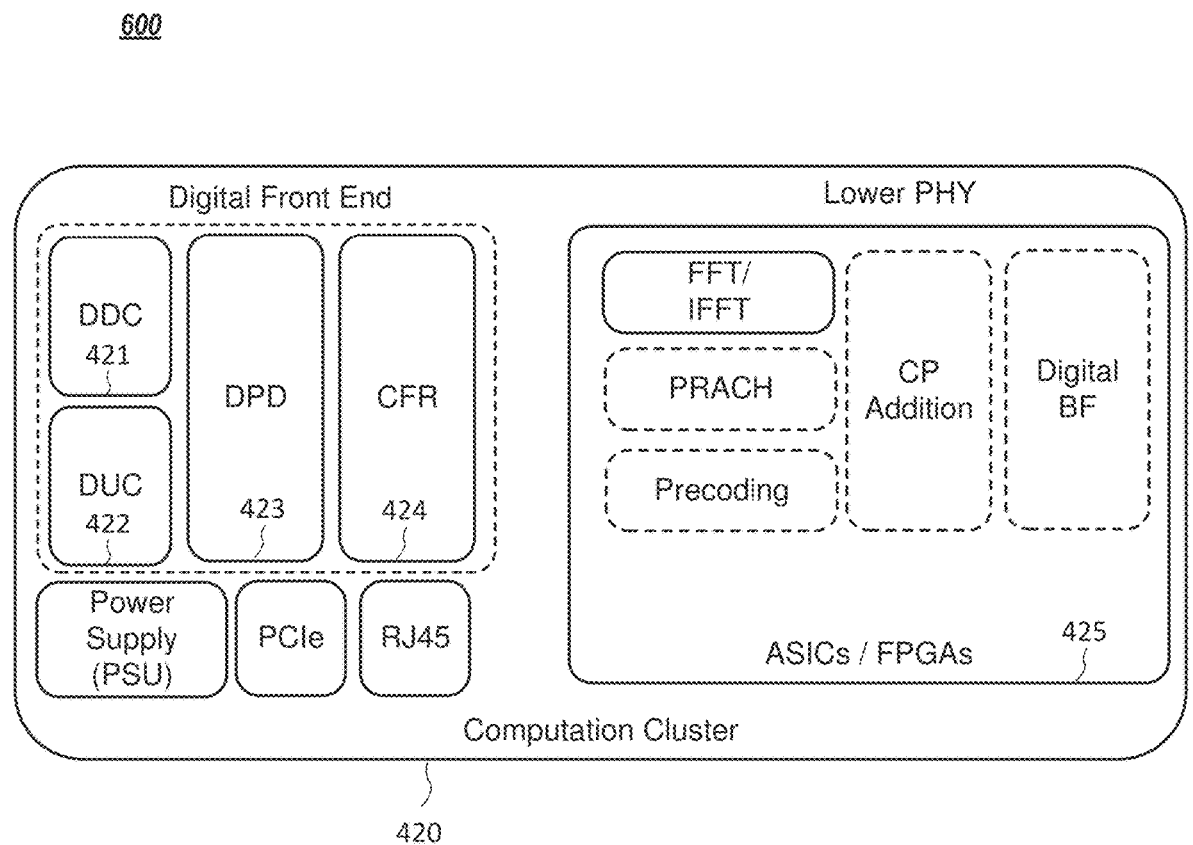
FIG. 6 depicts a block diagram of a computation cluster in the O-RU, according to embodiments of the present disclosure.

FIG. 6 depicts a block diagram of one computation cluster in the O-RU, according to embodiments of the present disclosure. The computation cluster 420 comprises various components or modules for handling digital front end and low PHY baseband processing. In one or more embodiments, the components or modules handling digital front end may comprise one or more digital up converters (DUCs) 421, one or more digital down converters (DDCs) 422, one or more digital pre-distortion (DPD) modules 423, and one or more crest factor reduction (CFR) modules 424. Low PHY baseband processing may be implemented by using one or more field-programmable gate arrays (FPGAs) or application-specific integrated circuits (ASICs) 425 to handle functions such as fast Fourier transform (FFT)/inverse fast Fourier transform (iFFT), frequency domain physical random access channel (PRACH) filtering, precoding, cyclic prefix (CP) addition/removal, and digital beamforming (BF), etc.

In one or more embodiments, for HA implementation within the same hardware (or O-RU), the computation cluster 420 may be configured to provide redundant compute resources with time synced computation, time stamping within the compute cluster to maintain a sub-symbol level granularity. With this feature, even sub-modules may be run on different compute clusters. The time-stamping may be enabled between the computation cluster 420 and the RF cluster 410 per instance. Furthermore, buffer occupancy variation may be used to indicate the system issues.

For HA implementation across locations, the computation cluster 420 may be configured to provide load sharing across different O-RU. At symbol boundary, the computation cluster 420 keeps on broadcasting internal states of the O-RU, such as frame, subframe, slot, and symbol ticks, internal states of buffers, DPD coefficients, CFR coefficients, etc. In one or more embodiments, across location may be referred to as across different sectors at the same physical site. For example, the first 120 degree in space may be covered in one sector, while the next 120 degree angle in space is covered by another RU on the same physical site. Essentially the HW computational cluster may service any of these sectors (angles).

Figure 7:
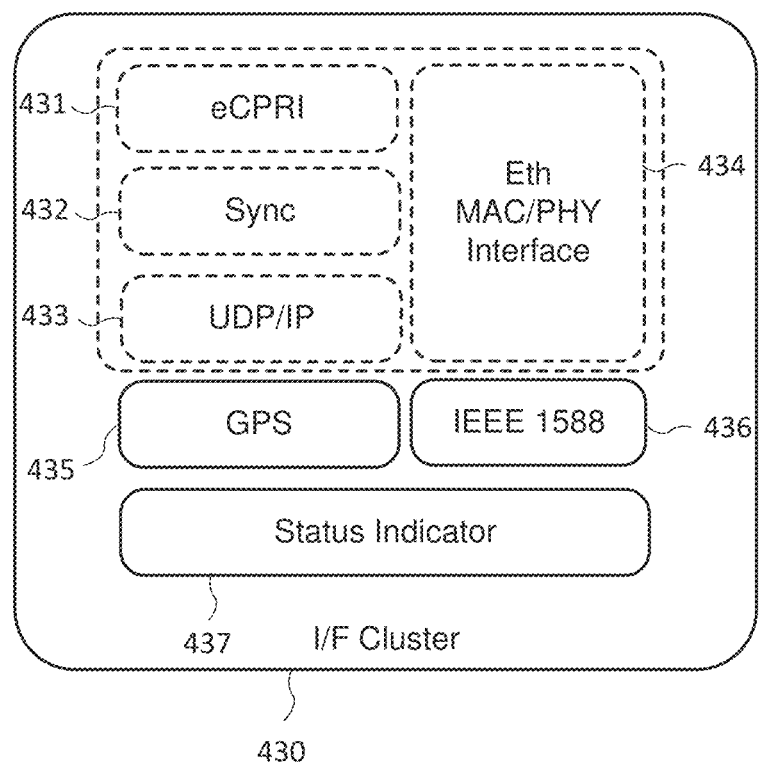
FIG. 7 depicts a block diagram of an interface cluster in the O-RU, according to embodiments of the present disclosure.

FIG. 7 depicts a block diagram of one interface cluster in the O-RU, according to embodiments of the present disclosure. The interface cluster 430 comprises various components or modules for synchronization 432 (e.g., via a GPS clock synchronization 435 and/or an IEEE 1588 precision time protocol 436) and fronthaul transport. In one or more embodiments, the fronthaul connectivity between O-RU and O-DU may be implemented via an enhanced Common Public Radio Interface (eCPRI) 431, which may be established using Fiber or Ethernet 434. Furthermore, the interface cluster 430 may comprise one or more status indicators 437, e.g., LEDs, displaying status for fronthaul transport interface. In one or more embodiments, the O-RAN fronthaul specifications may also support a protocol stack that transmits the signals over User Datagram Protocol (UDP)/ Internet Protocol (IP) suite 433, which provides a direct way to send and receive datagrams over an IP network. The UDP/IP may be used for broadcasting messages over a network.

FIG. 8 depicts a flow diagram for high availability management in a cell site O-Cloud comprising multiple O-RUs, according to embodiments of the present disclosure. Each O-RU comprises one or more RF clusters, one or more computation clusters, and one or more interface clusters. In step 805, each of the multiple O-RUs couples to a local HA manager, respectively. In step 810, one or more O-RU instances are instantiated, with redundancy, on the cell site O-Cloud to serve one or more users respectively. The one or more O-RU instances involve one or more O-RUs among the multiple O-RUs. Each O-RU instance comprises at least one RF cluster, at least one computation cluster, and at least one interface cluster. The redundancy may be referred to as an RF cluster redundancy, a computation cluster redundancy, an interface cluster redundancy, or a combination redundancy for RF/computation/interface clusters. In some embodiments, one O-RU may have one or more O-RU instances, and one O-RU instance may involve one or more O-RUs in the cell site O-Cloud.

In step 815, the local HA manager for each of the one or more O-RU instances monitors instance performance of the one or more O-RU instances for failure prediction/detection. The local HA manager may use AI/ML based algorithm to monitor one or more parameters comprising O-RU temperature, RF power, a change rate of temperature, a change rate of RF output power, a change rate of voltage, a change rate of current, data rate, latency, etc.

In step 820, in response to a failure for the at least one O-RU instance being detected or predicted, one or more new O-RU instances are instantiated intra O-RU (in the same O-RU with detected/predicted O-RU instance failure) or across O-RU (in another O-RU) for replacement. For example, when the latency for one O-RU instance is beyond a latency threshold, the O-RU instance may need to be replaced by a new O-RU instance. The failure may be referred to as one or more parameters being above or below a predetermined threshold. The new O-RU instance may be referred to as an O-RU instance having at least one of a new RF cluster, a new computation cluster, and a new interface cluster as compared to an existing O-RU instance. For example, an existing O-RU instance may be replaced as a new O-RU instance by changing an RF cluster (or a computation cluster, etc.) in the existing O-RU into a new RF cluster (or a new computation cluster, etc.). New O-RU instance instantiation in another O-RU may be implemented via a centralized HA manager that couples to the local HA manager of the O-RU and a local HA manager of the another O-RU. In one or more embodiments, the centralized HA manager may implement load balancing across O-RUs or cell sites when the number of O-RU instances in one O-RU is excessive, e.g., above a predetermined number.

In one or more embodiments, high availability management for O-RU instances may be implemented independently or in combination with high availability management for O-DU instances, described in detail in Section C below, for O-Cloud services.

C. Embodiments for High Availability in O-DU

Figure 9:
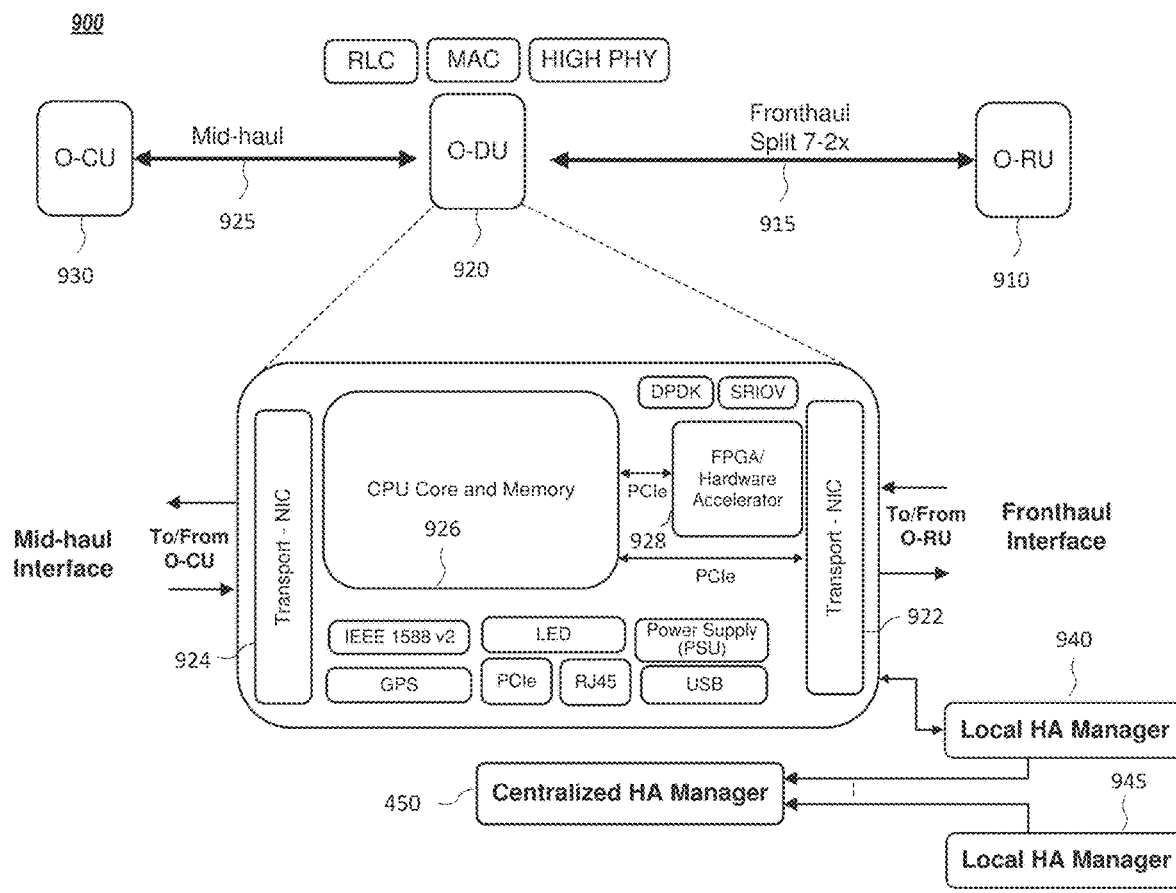
FIG. 9 depicts a schematic diagram of an interaction of an O-RAN distributed unit (O-DU) with an O-RU and an O-RAN control unit (O-CU), according to embodiments of the present disclosure.

FIG. 9 depicts a schematic diagram of an interaction of an O-DU 920 with an O-RU 910 and an O-CU 930, according to embodiments of the present disclosure. The O-DU 920 couples to the O-RU and the O-CU via fronthaul 915 and mid-haul interface 925 respectively. The fronthaul 915 may be an open fronthaul between the O-DU and one or more O-RUs to allow connection between any vendor DU and any vendor RU. To enable this multi-vendor DU and RU interconnection some signaling formats and control messaging are detailed by Open Standard, i.e., O-RAN Alliance, as part of O-RAN fronthaul specification. O-RAN details synchronization architectures for 7-2x split in open fronthaul networks. O-RAN fronthaul defines operations in different planes:

Control Plane (C-Plane): defining scheduling, coordination required for data transfer, beam-forming, etc.

User Plane (U-Plane): for efficient data transfer within the strict time limits of 5G numerologies.

Synchronization Plane (S-Plane): responsible for the timing and sync aspects between O-DU and O-RU. For O-RAN cloud deployments, a high accurate synchronization between an O-DU and O-RUs may be necessary to achieve controlled linking for inter-O-RU synchronization for time division duplex (TDD), carrier aggregation using multiple O-RUs, multiple-input and multiple-output (MIMO), and similar processes.

In one or more embodiments, the O-DU 920 comprises a transport network interface controller (NIC, also known as a network interface card) 922 for O-RU communication, a transport NIC 924 for O-CU communication, one or more CPU cores and memory blocks 926 coupled to the transport NICs 922 and 924, one or more hardware accelerators 928, etc. The one or more CPU cores and memory blocks 926 may be instantiated into one or more O-DU instances to enable one or more network function virtualizations (VNFs). The O-DU 920 may further comprise O-DU hardware accelerator 928, e.g., FPGA, for processing various functions at the high PHY, MAC, and RLC layers. Different software kits, e.g., Data Plane Development Kit (DPDK), single root I/O virtualization (SR-IOV), etc., may be used for O-DU performance enhancement. The O-DU 920 may further comprise a synchronization module to support synchronization between the O-DU and O-CU/O-RU via GPS clock and/or an IEEE 1588v2 precision time protocol (PTP) and fronthaul transport.

A local HA manager 940 couples to the O-DU 920 for monitoring internal states of the O-DU 920 and broadcasting internal state to other servers. In one or more embodiments, the local HA managers (940, 945 . . . ) for O-DUs are separate from the local HA managers (440, 445 . . . ) for O-RUs. The internal states may comprise buffer fullness level, channel state information, frame/subframe/slot/symbol ticks, hybrid automatic repeat request (HARQ) buffer information, etc. The local HA manager 940 may use AI/ML based algorithm for O-DU instance monitoring. The local HA manager 940 may also establish a low latency path to a centralized HA manager 450, which may be deployed on the cloud, such as on a regional cloud (O-CU). The centralized HA manager 450 may connect to a plurality of local HA managers for O-RUs (e.g., local HA manager 440 and 445) and a plurality of local HA managers for O-DUs (e.g., local HA managers 940 and 945), such that the centralized HA manager may implement HA management at a higher hierarchical lever across O-RUs and/or O-DUs.

Figure 10:
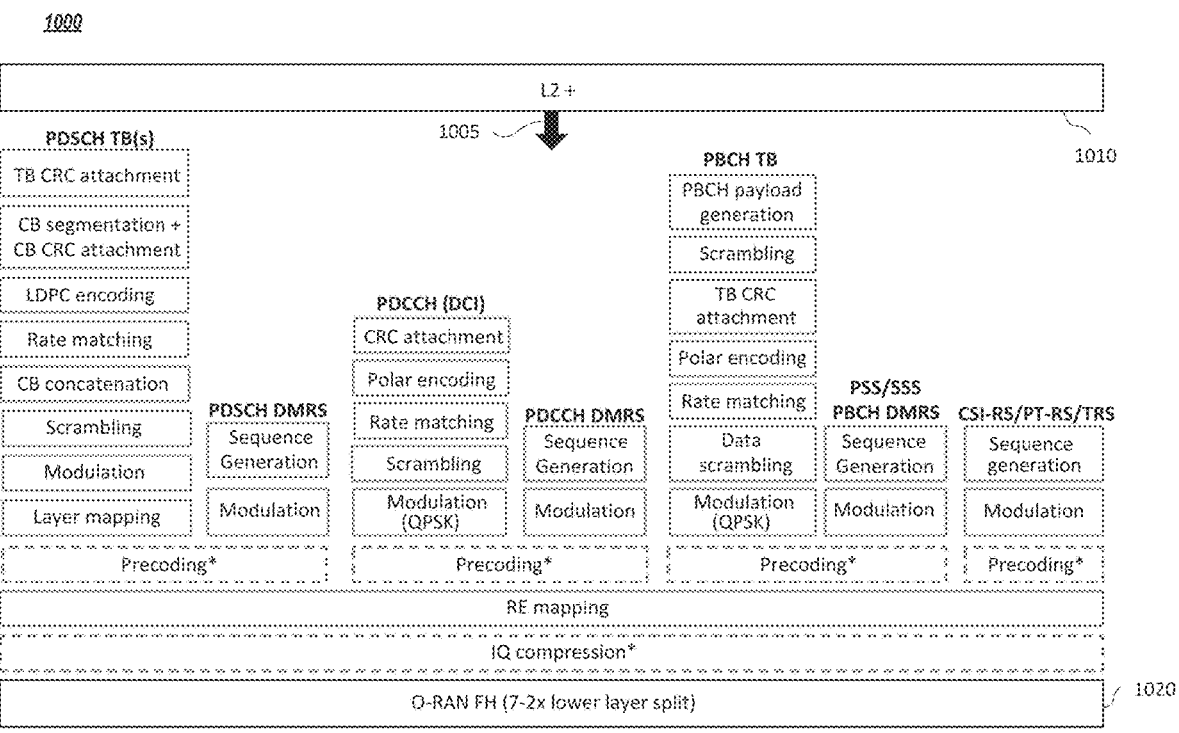
FIG. 10 depicts a diagram of O-DU PHY processing blocks for downlink flow, according to embodiments of the present disclosure.

FIG. 10 depicts a diagram of O-DU PHY processing blocks for downlink flows, according to embodiments of the present disclosure. Downlink data 1005 from layer 2 or above 1010 may comprise physical downlink shared channel (PDSCH) transport block (TBs), PDSCH demodulation reference signals (DMRS), physical downlink control channel (PDCCH) downlink control information (DCI), PDCCH demodulation reference signal (DMRS), Physical Broadcast Channel (PBCH) TBs, primary synchronization signal (SSS)/secondary synchronization signal (SSS) PBCH DMRS, and reference signals, such as channel state information reference signal (CSI-RS), phase tracking reference signal (PT-RS), and/or tracking reference signal (TRS). These different parts of the downlink data 1005 undergo respective data processing processes. For example, PDSCH TBs may have processing steps comprising TB cyclic redundancy check (CRC) attachment, codeblock (CB) segmentation, low-density parity-check (LDPC) encoding, rate matching, CB concatenation, scrambling, modulation, and layer mapping, etc. The different parts of the downlink data 1005, upon respective processing, may be jointly processed together, e.g., resource element (RE) mapping and in-phase and quadrature (IQ) compression, for downlink transmission via an O-RAN fronthaul interface 1020 to one or more O-RUs.

Figure 11:
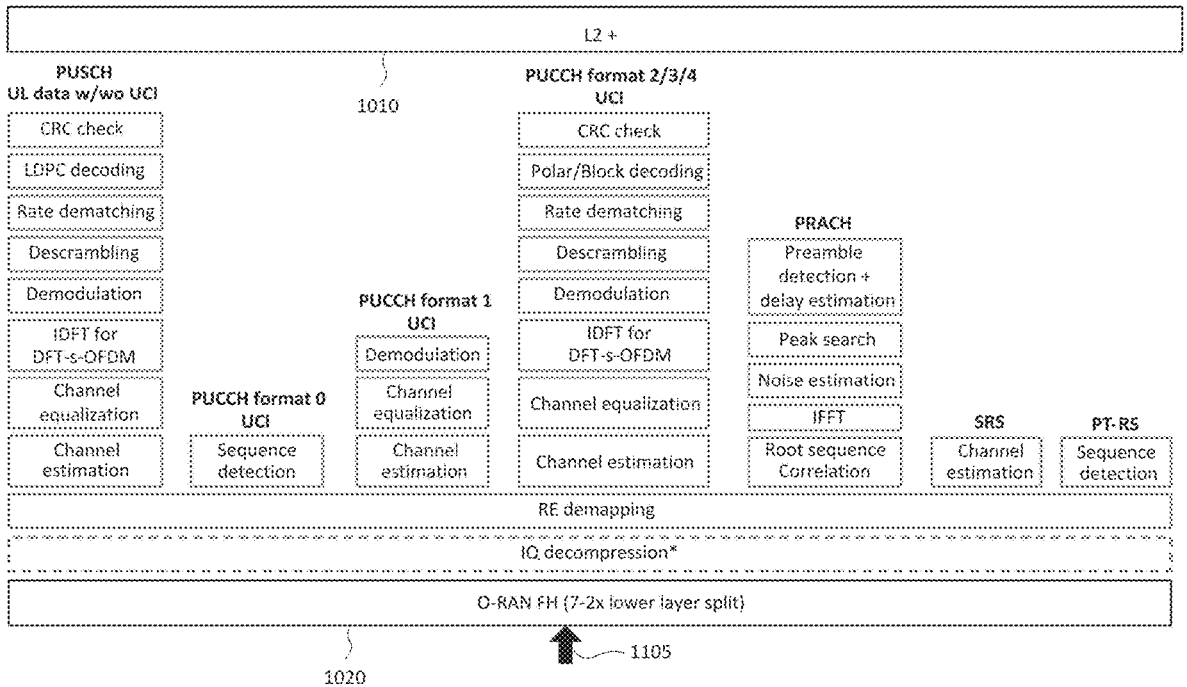
FIG. 11 depicts a diagram of O-DU PHY processing blocks for uplink flow, according to embodiments of the present disclosure.

FIG. 11 depicts a diagram of O-DU PHY processing blocks for uplink flow, according to embodiments of the present disclosure. Downlink data 1105 sent from one or more O-RUs via the O-RAN fronthaul interface 1020 is processed at the O-DU for RE mapping and IQ compression, and then decomposed into multiple data components for respective processing. The multiple data components may comprise physical uplink shared channel (PUSCH) data (with or without uplink control information (UCI)), physical uplink control channel (PUCCH) DCI, PRACH, reference signals, such as sounding reference signal (SRS) or PT-RS, etc. For example, the PUSCH data may undergo processings comprising channel estimation, channel equalization, inverse discrete Fourier transform (IDFT), demodulation, descrambling, rata rematching, LDPC decoding, and/or CRC checking. The multiple data components, after respective processing, may be transmitted to layer 2 or above at the O-DU for further processing.

Figure 12:
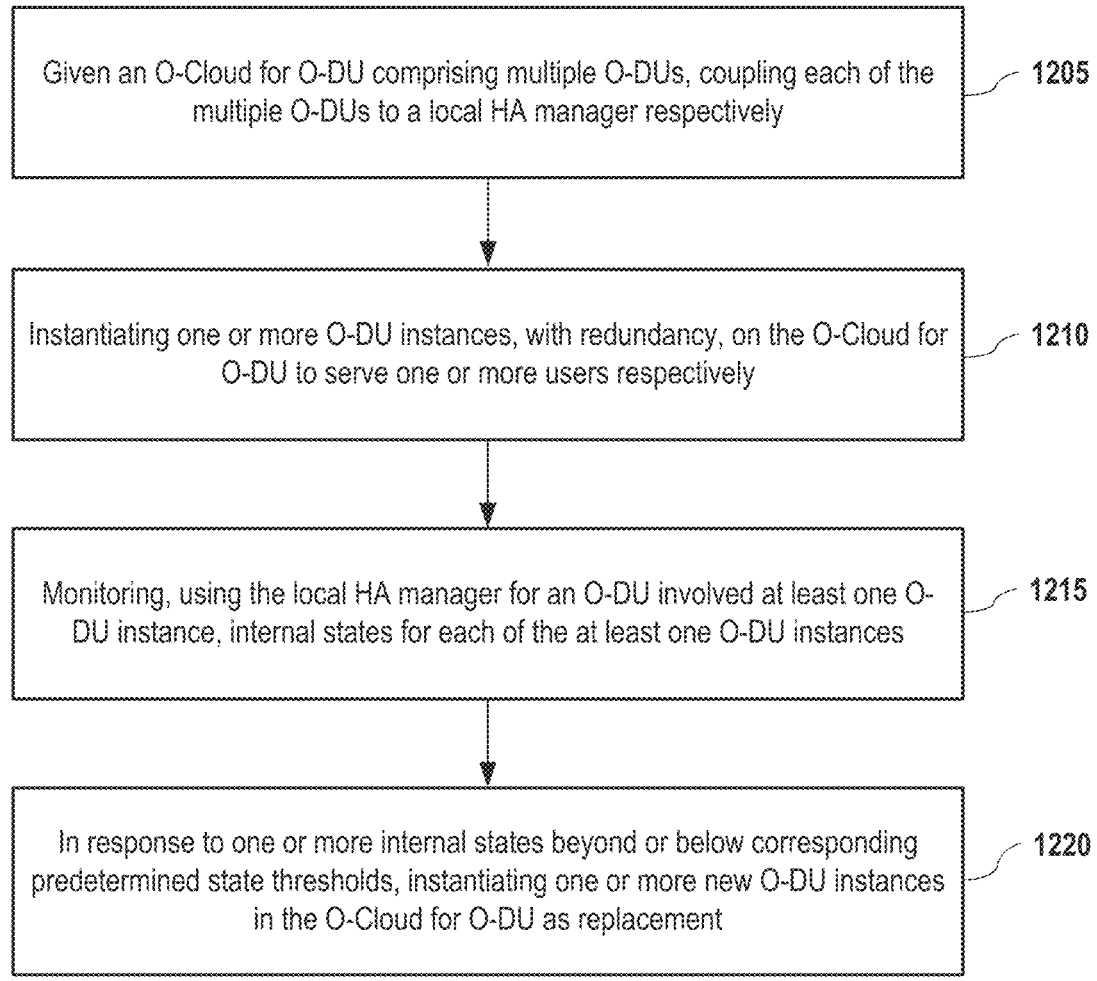
FIG. 12 depicts a flow diagram for high availability management in O-DU, according to embodiments of the present disclosure.

FIG. 12 depicts a flow diagram for high availability management in an O-Cloud for O-DU, according to embodiments of the present disclosure. The O-Cloud for O-DU comprises multiple O-DUs and may be an Edge O-Cloud or be the same as the cell site O-Cloud comprising multiple O-RUs. Each O-DU comprises one or more cores and memory blocks that may be instantiated into one or more O-DU instances to enable one or more network function virtualizations (VNFs). Each O-DU may further comprise one or more O-DU hardware accelerators to process various functions at the high PHY, MAC, and RLC layers.

In step 1205, each of the multiple O-DUs couples to a local HA manager respectively. In step 1210, one or more O-DU instances are instantiated, with redundancy, on the O-Cloud for O-DU to serve one or more users. Each O-DU instance involves at least one core, at least one memory block, and optionally an O-DU hardware accelerator. The redundancy may be a core redundancy, a memory block redundancy, an O-DU hardware accelerator redundancy, or a combination thereof. In some embodiments, one O-DU may have one or more O-DU instances, and one O-DU instance may involve one or more O-DUs in the O-Cloud for O-DU.

In step 1215, the local HA manager for an O-DU involved at least one O-DU instance monitors internal states for each of the at least one O-DU instances. The monitored internal states may comprise buffer fullness level, frame/subframe/slot/symbol ticks, HARQ buffer information, etc.

In step 1220, in response to one or more internal states beyond or below corresponding predetermined state thresholds, one or more new O-DU instances are instantiated in the O-Cloud for O-DU, e.g., in the O-DU or in another O-DU as a replacement for the at least one O-DU instance. For example, when the buffer fullness for one O-DU instance is beyond a fullness threshold, the O-DU instance may need to be replaced by a new O-DU instance with more resources to maintain a desired operation performance. The new O-DU instance may be referred to as an O-DU instance that uses newly allotted cores and/or memory blocks, or an O-DU instance that has added cores and/or memory blocks in addition to originally allotted resources. For example, an existing O-DU instance may be replaced as a new O-DU instance by adding more resources, e.g., more cores and memory blocks, to the existing O-DU. New O-DU instance instantiation in another O-DU may be implemented via a centralized HA manager that couples to the local HA manager of the O-DU and a local HA manager of the another O-DU. In one or more embodiments, the centralized HA manager may implement load balancing across O-DUs when the number of O-DU instances in one O-DU is excessive, e.g., above a predetermined number.

In one or more embodiments, high availability management for O-DU instances may be implemented independently or in combination with the aforementioned high availability management for O-RU instances.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A method for telecommunication management in an open radio access network (O-RAN), the method comprising:

coupling each of multiple O-RAN radio units (O-RUs) in the O-RAN to a corresponding local high availability (HA) manager for O-RU;

coupling each of multiple O-RAN distributed units (O-DUs) in the O-RAN to a corresponding local HA manager for O-DU;

instantiating one or more O-RU instances on a cell site O-RAN cloud (O-Cloud) of the O-RAN to serve one or more users, instance performance of each of O-RU instance is monitored using a corresponding local HA manager for O-RU, each O-RU instance involves at least one RF cluster handling RF front end, at least one computation cluster handling digital front end (DFE) and low PHY, and at least one interface cluster handling fronthaul transport to/from an O-DU among the multiple O-DUs; and instantiating one or more O-DU instances on an edge cloud of the O-RAN, instance performance of each of O-DU instance is monitored using a corresponding local HA manager for O-DU, each O-DU instance involves at least one core, at least one memory block, and at least one O-DU hardware accelerator.

2. The method of claim 1 wherein each O-RU supports at least one O-RU instance, and each O-DU supports at least one O-DU instance.

3. The method of claim 1 wherein each O-RU instance involves one or more O-RUs among the multiple O-RUs, and each O-DU instance involves one or more O-DUs among the multiple O-DUs.

4. The method of claim 1 wherein the one or more O-RU instances and the one or more O-DU instances are instantiated with redundancy.

5. The method of claim 1 wherein the redundancy is a core redundancy, a memory block redundancy, an O-DU hardware accelerator redundancy, or a combination thereof.

6. The method of claim 1 wherein the local HA managers for O-RU and the local HA managers for O-DU couple to a centralized HA manager to implement hierarchical HA management.

7. The method of claim 6 wherein the centralized HA manager is deployed on a regional cloud for a control unit (O-CU) of the O-RAN for HA management at a hierarchical level higher than the local HA managers for O-RU and the local HA managers for O-DU.

8. The method of claim 6 wherein load balancing is implemented, by the centralized HA manager, across the multiple O-RUs and across the multiple O-DUs.

9. The method of claim 6 wherein HA management for the one or more O-RU instances is implemented independently or in combination with HA management for the one or more O-DU instances.

10. A system for telecommunication management in an open radio access network (O-RAN) comprising:
a plurality of local high availability (HA) managers for O-RAN radio unit (O-RU), each local HA manager for O-RU couples to a corresponding O-RU, among multiple O-RUs in the O-RAN, the plurality of local HA managers for O-RU are configured for:
instantiating one or more O-RU instances on a cell site O-RAN cloud (O-Cloud) of the O-RAN to serve one or more users, each O-RU instance involves at least one RF cluster handling RF front end, at least one computation cluster handling digital front end (DFE) and low PHY, and at least one interface cluster handling fronthaul transport to/from an O-DU among the multiple O-DUs; and
monitoring instance performance of the one or more O-RU instances;
a plurality of local HA managers for O-RAN distributed unit (O-DU), each local HA manager for O-DU couples to a corresponding O-DU, among multiple O-DUs in the O-RAN, the plurality of local HA managers for O-DU are configured for:
instantiating one or more O-DU instances on an edge cloud of the O-RAN to serve one or more users, each O-DU instance involves at least one core, at least one memory block, and at least one O-DU hardware accelerator; and
monitoring instance performance of the one or more O-DU instances.

11. The system of claim 10 wherein each O-RU supports at least one O-RU instance, and each O-DU supports at least one O-DU instance.

12. The system of claim 10 wherein each O-RU instance involves one or more O-RUs among the multiple O-RUs, and each O-DU instance involves one or more O-DUs among the multiple O-DUs.

13. The system of claim 10 wherein the one or more O-RU instances and the one or more O-DU instances are instantiated with redundancy.

14. The system of claim 10 wherein the redundancy is a core redundancy, a memory block redundancy, an O-DU hardware accelerator redundancy, or a combination thereof.

15. The system of claim 10 further comprising:
a centralized HA manager coupled to the plurality of local HA managers for O-RU and the plurality of local HA managers for O-DU to implement hierarchical HA management.

16. The system of claim 15 wherein the centralized HA manager is deployed on a regional cloud for a control unit (O-CU) of the O-RAN for HA management at a hierarchical level higher than the plurality of local HA managers for O-RU and the plurality of local HA managers for O-DU.

17. The system of claim 15 wherein the centralized HA manager implements load balancing across the plurality of local HA managers for O-RU and across the plurality of local HA managers for O-DU.

18. The system of claim 15 wherein HA management for the one or more O-RU instances is implemented independently or in combination with HA management for the one or more O-DU instances.

* * * * *